Feb. 3, 1970     S. J. POPEIL     3,493,723
ELECTRIC STEAMING APPLIANCE
Filed June 24, 1968     3 Sheets-Sheet 1

INVENTOR
SAMUEL J. POPEIL
ATTYS.

Feb. 3, 1970     S. J. POPEIL     3,493,723
ELECTRIC STEAMING APPLIANCE
Filed June 24, 1968     3 Sheets-Sheet 2
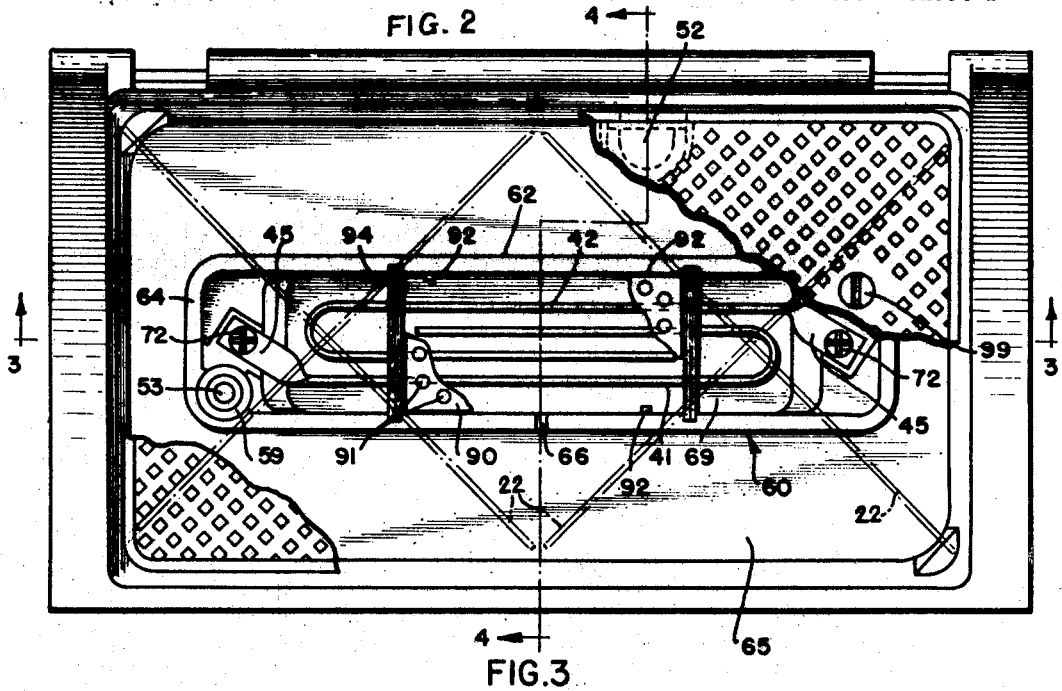
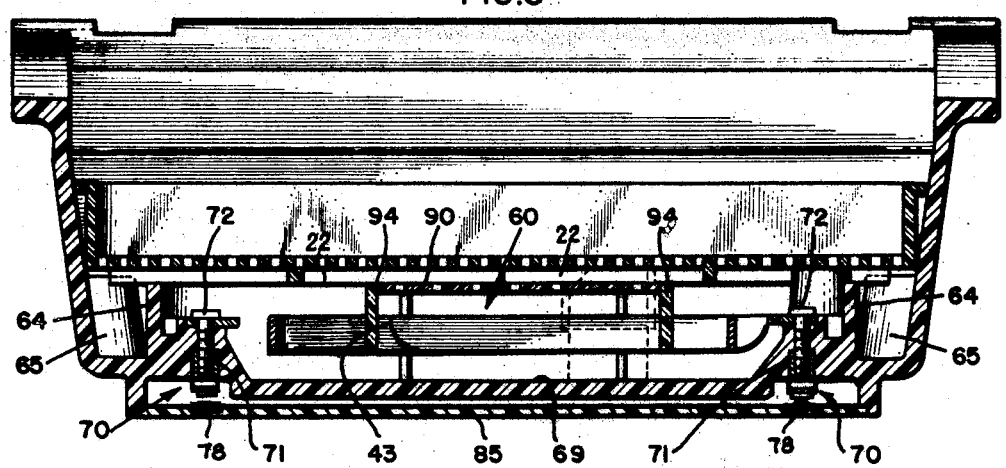
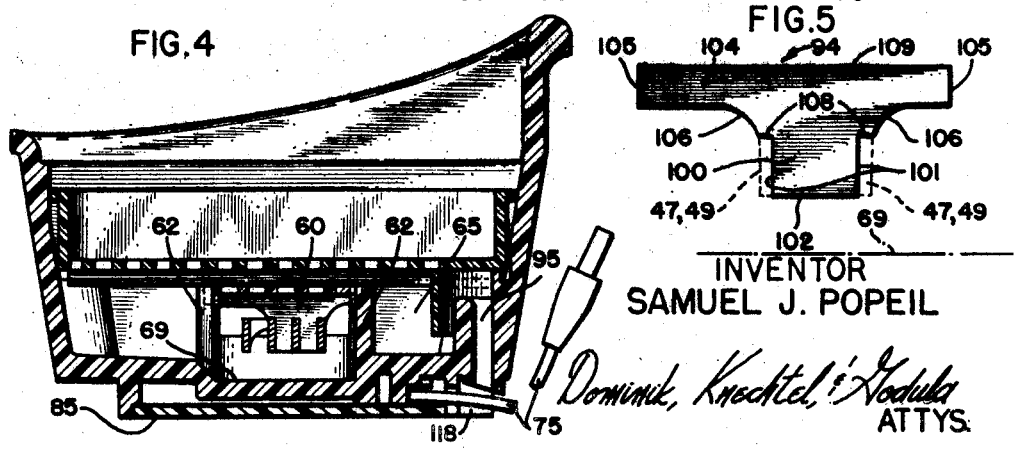
INVENTOR
SAMUEL J. POPEIL
Dominik, Knechtel & Godula
ATTYS.

Feb. 3, 1970 S. J. POPEIL 3,493,723
ELECTRIC STEAMING APPLIANCE
Filed June 24, 1968 3 Sheets-Sheet 3

INVENTOR
SAMUEL J. POPEIL

Dominik, Knechtel, & Hodula
ATTYS.

United States Patent Office 3,493,723
Patented Feb. 3, 1970

3,493,723
ELECTRIC STEAMING APPLIANCE
Samuel J. Popeil, Chicago, Ill., assignor to Popeil Brothers, Inc., Chicago, Ill., a corporation of Delaware
Continuation-in-part of applications Ser. No. 616,548, Feb. 16, 1967, and Ser. No. 695,043, Jan. 2, 1968. This application June 24, 1968, Ser. No. 739,521
Int. Cl. H05b 3/60
U.S. Cl. 219—288                         14 Claims

ABSTRACT OF THE DISCLOSURE

An electric steam generating appliance has a pair of U-shaped interdigitated electrodes. The electrodes are separated from each other by a bridge member which accomplishes the two fold purpose of separation and reducing tracking. A bubble plate is provided to cover the active area of steam generation to reduce moisture propagation and current leakage. A power cord safety lock is provided in the base of the appliance. The appliance has a safety switch means to deenergize the electrodes when the device is tilted or lifted from a surface on which the appliance rests during use.

---

This application is a continuation-in-part of copending application Ser. No. 695,043, filed Jan. 2, 1968 and earlier filed application Ser. No. 616,548, filed Feb. 16, 1967 (now abandoned).

The present invention relates to a resistance heating assembly. While the use shown and described relates to a steam chest which finds its principal utility when employed in heating rollers for use as a personal hairdresser, the same is applicable for use in such diverse products as facial saunas, vaporizers, sterilizers, egg cookers, bottle warmers, steamers for steaming foods in packets, and the like.

Resistance heaters operate on the principle that a pair of oppositely charged electrodes when positioned in water will transfer current through the water between the electrodes thereby heating the water to the boiling point and emitting steam. Obviously some mineral content must be present in the water, as pure distilled water will not carry sufficient current to operate successfully. It should be borne in mind, however, that in certain locales, the mineral content of the water is unusually high, and therefore a safe resistance heating assembly must be designed to accommodate unusually high mineral contents without becoming unduly corroded, and without giving rise to the phenomenon of arcing which can occur directly across the electrodes when the mineral content of the water is too high. Furthermore, while ordinary household voltage usually is between 110 and 120 volts, provision must be made for the possibility of power surges attributable to variations in line voltage irrespective of the source. When such increased voltages occur, even though they might not be sufficient to produce arcing across the electrodes, tracking can result when the current passes from the electrode supports across the container to the opposite electrode.

Finally, it is entirely possible that bubbling of the contained water in a resistance heating assembly can result in the deposit of moistures in areas where a person may touch the moist area with his hand, or the person may be holding a conductive article such as a spoon and touch the moist area, and simultaneously touch a grounded object such as a bathroom faucet.

It is therefore the primary object of the present invention to provide a resistance heating assembly in which safety is maximized by eliminating arcing, and reducing tracking and current leakage to within unusually safe tolerances.

In the structure to be described in detail hereinafter, a pair of U-shaped resistance electrodes are employed in order to maximize the opposed areas of electrodes to begin the generation of steam quickly. Because the electrodes are supported at one end in a cantilever fashion, it is possible that the same can become misaligned due to jostling in traveling, or faulty assembly. Accordingly, it is another significant object of the present invention to provide a structure which positively locks the electrodes in their preferred spaced relationship against dislodgment, thereby offering the twofold advantage of definite alignment in operation, and insurance against misalignment which could result, in extreme cases, in a direct short.

A more detailed object of the present invention looks to the provision of a support member in the form of a bridge which secures the U-shaped electrodes in proper alignment and against dislodgment and provides electrical contact only on electrode portions of like polarity, thereby eliminating the possibility of tracking across the support member.

Still another detailed object of the invention looks to the provision of a diffuser which will inhibit the passage of large droplets of water above the steam generating area so that the possibility of a user receiving an electrical shock is effectively eliminated.

It will become apparent as the detailed description of an illustrative embodiment proceeds, the invention stems from the discovery that a bridge member may be positioned across the cantilerverly supported electrodes and secured to the sidewalls of the steam generating area. Desirably the free end of the electrode which is unsupported is radiused to eliminate corners from which electrical discharge will readily occur. Further, a bubble diffuser plate is optionally provided over the steam generating area which serves the purpose of breaking up moisture bubbles. In even greater detail, the dimensional relationship between the configuration of the bridge and its orientation within the steam generating area is such that once the electrodes are locked in place, and a cover member secured over the steam generating area, they cannot be dislodged downwardly or laterally to a position of electrical misalignment which could result in arcing, or in extreme cases, in a direct short.

Another primary object is to eliminate the possibility of the party using the device such as a steam chest from receiving an electrical shock as a result of tilting and/or lifting the device in a fashion such as to cause the water in it to be exposed so that the water and a grounded object can be simultaneously contacted.

This latter object is satisfied by providing a pair of safety switches of the bottom of the device containing the resistance heating assembly. These safety switches operate to open the energizing circuit for the electrodes forming the resistance heating assembly, whenever the device is tilted or lifted.

Further objects and advantages of the present invention will become apparent as the following description of an illustrative embodiment proceeds, taken in conjunction with the accompanying drawings in which:

FIG. 2 is a top view of the base member shown in FIG. 1 with the perforated tray partially broken away to show the assembled relationship between the resistance heating electrodes.

FIG. 3 is a longitudinal sectional view of the member shown in FIG. 2 taken along section line 3—3 of FIG. 2.

FIG. 4 is a transverse sectional view of the base member of the steam generating unit shown in FIG. 2 taken along section line 4—4 of FIG. 2.

FIG. 5 is an enlarged plan view of the electrode bridge shown in perspective in FIG. 1.

Figure 1:
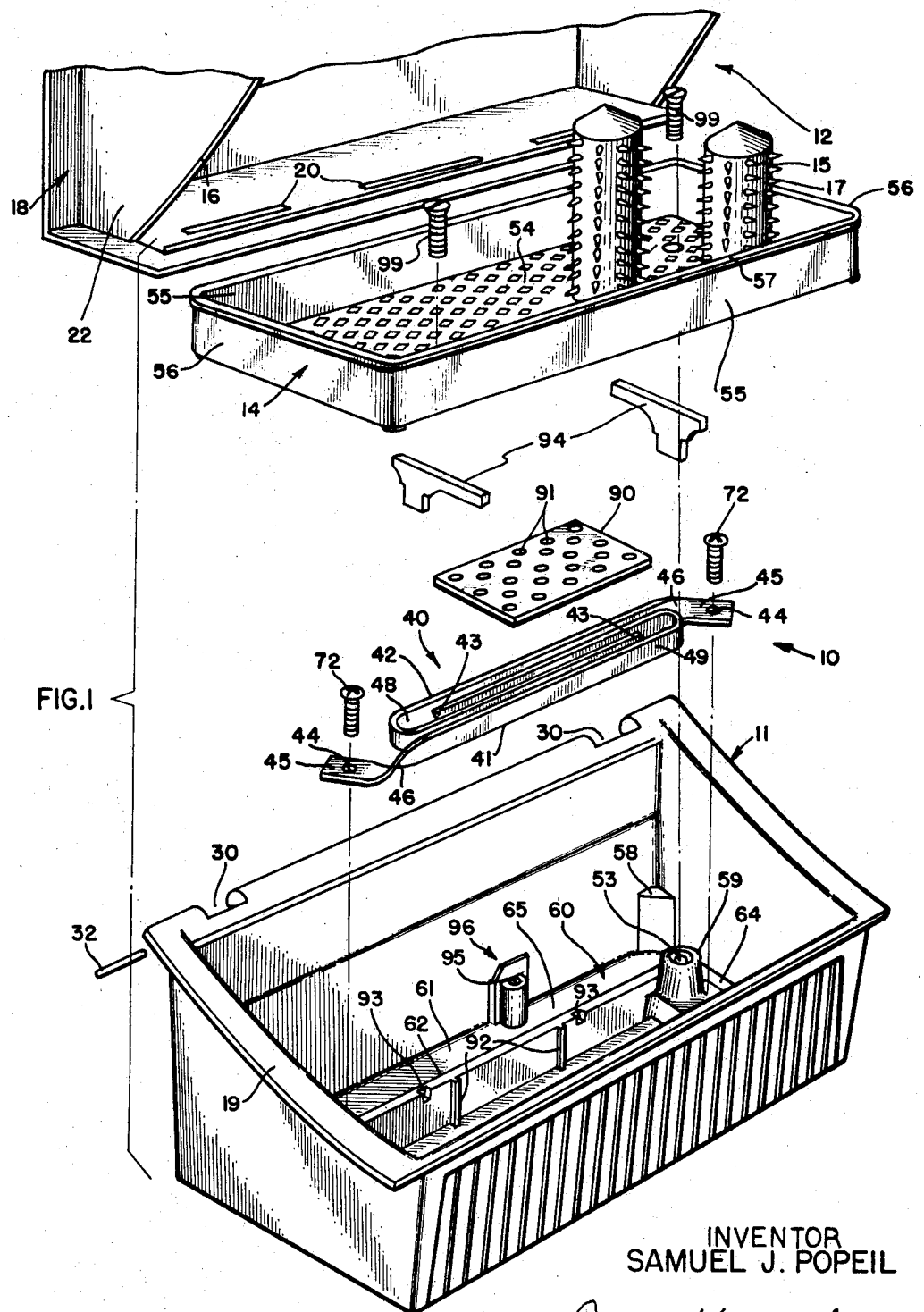
FIG. 1 is a perspective exploded view of a steam chest showing a base, cover, and perforated support tray along with the elements of the steam generating resistance heating unit.

As pointed out above, the resistance heating assembly of the present invention finds ideal illustration in a steam chest 10 (see FIG. 1) which comprises a base 11 and cover 12. In this particular illustrative steam chest a perforated roller tray 14 is provided in which a plurality of rollers 15 are positioned for steaming, and subsequent insertion into the hair. As the following description proceeds, however, it will become apparent that the resistance heating element may also be employed in other steaming devices such as bottle warmers, sterilizers, egg cookers and the like.

The steam chest 10 has a sealing flange 16 surrounding the under portion of the cover 12 which cooperates with the base top rim 19 so that the internally generated steam will bathe the rollers 15 and their spines 17 heating and moistening the same at a temperature slightly below that of the generated steam. In usage, after some 10 minutes of steaming, the cover 12 is opened by grasping the same at the lateral finger grip portions 18, the same swiveling rearwardly as a result of the connection between the cover 12 and the base 11 by means of the hinge assembly 30 and hinge pin 32.

Referring further to FIG. 1 it will be seen that the heater assembly 40 comprises a pair of U-shaped electrodes 41, 42 which are interdigited, that is, one leg of the electrodes is disposed between the legs of the other electrode. The U-shaped electrodes have U-shaped body portions oriented in a vertical plane and terminate in a flat mounting portion 45 in a horizontal plane. Intermediate the flat mounting portion 45 and the U-shaped body portion 47, 48 is a twist 46 which is twisted so that the U-shaped body portions 47, 48 are cantileverly inclined at a slight angle with the horizontal plane of the flat mounting portion 45. Mounting apertures 44 are provided in each of the flat mounting portions 45 for electrical and physical connection by means of the electrode screws 72 as will be detailed hereinafter.

The electrode assembly 40 is mounted within the steam well 60 which is in the configuration of a rectangular dam 61 having dam side walls 62 and dam ends 64. Peripherally surrounding the steam well 60 is a reservoir area 65 in which water is stored for transmission via the inlet slot 66 (see FIG. 2) which in turn bathes the electrodes 41, 42 which generate the steam. As will be noted, the electrodes are mounted above the steam well bottom 69 (see FIG. 4) to reduce the possibility of arcing and tracking.

The assembly as shown in FIG. 1 is completed by mounting the perforated roller tray 14 on top of the steam well assembly so that the flanges 57 formed on the upper edge of the sides 55 and ends 56 of the perforated tray 14 generally abuts the inner portion of the steam chest base 11, and the bottom of the tray sits atop the tray supports 58 which are molded into the corners of the base 11, as can be best seen in FIG. 3. The roller tray 14 has ribs 22 on the underside of its bottom wall, for both increased rigidity and for confining a free floating bubble plate 90, described more fully below. These ribs 22 criss-cross and form a generally diamond-shaped lattice, with one centrally positioned diamond which functions to confine the above-mentioned bubble plate 90. A splash shield 52 (see FIG. 2) is an imperforate portion of the perforated base 54 of the perforated tray 14 and is secured above the drain boss 96 and its drain hole 95 so that as water is filled into the unit it will not pour out directly through the drain hole 95. As best shown in FIG. 2, the perforated tray is secured by means of screws 99 which engage tinnerman inserts 53 in the tray mounting bosses 59 which are positioned at diagonally opposite locations on the corners of the rectangular dam 61.

Figure 6:
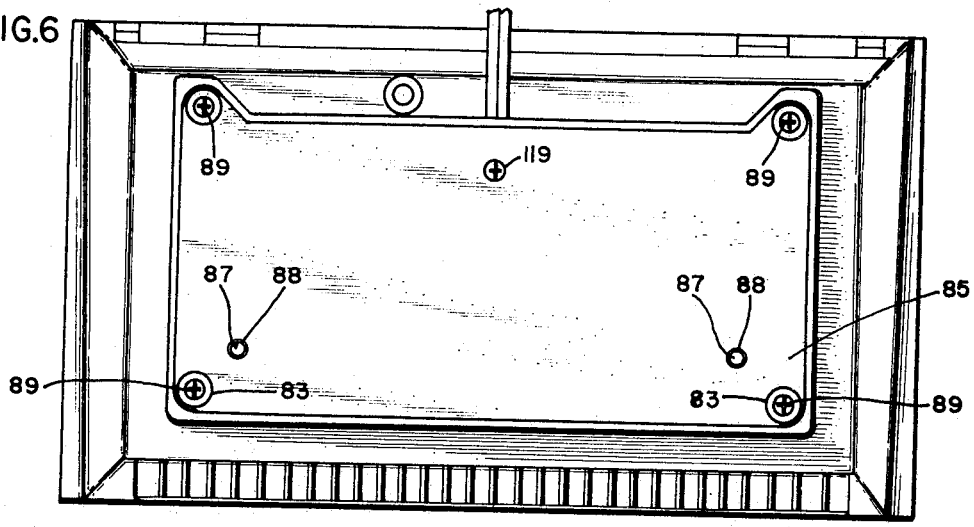
FIG. 6 is a bottom plan view of the steam chest, illustrating the positioning of the safety switches.
Figure 7:
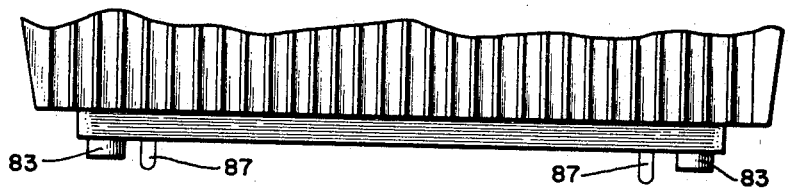
FIG. 7 is a partial side plan view of the steam chest, illustrating the manner in which the safety switches project out of the bottom of the steam chest.
Figure 8:
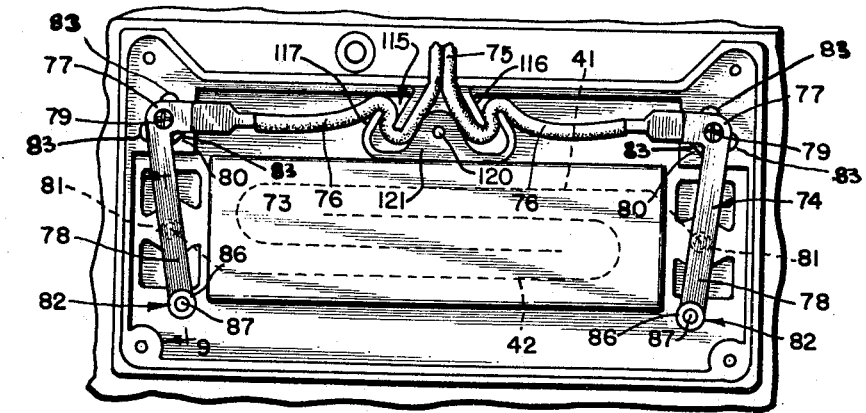
FIG. 8 is a bottom plan view of the steam chest with the bottom closure plate removed to illustrate the construction of the safety switches and the manner in which they are affixed within the steam chest.
Figure 9:
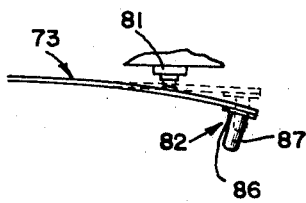
FIG. 9 is a sectional view taken along line 9—9 of FIG. 8.

As shown particularly in FIG. 8, the electrical power cord 75 is split into two electrode leads 76, and each of these electrode leads is secured to one of the two safety switches 73 and 74. These safety switches are in the form of resilient leaf springs having an apertured anchor portion 77 and a contact arm portion 78. The anchor portions 77 are secured by means of threaded screws 79 to a flat anchor ledge 80 former on the base 11, with the contact arm portions 78 extending over electrical contacts 81. A number (three, as illustrated) of raised bosses 83 are integrally formed with each of the anchor ledges 80 and are located to positionally align the safety switches 73 and 74 with the contacts 81 and to prevent them from becoming mis-aligned. Electrical contacts 81 comprise the exposed ends of electrode screws 72 which secure the flat mounting portion 45 of the electrodes 41, 42 to the steam well 60. Watertight bushings 71 are provided to prevent leakage into the underneath area of the steam well base 69. A non-conductive pin-like member 82 having an enlarged head portion 86 and a stem portion 87 is secured to the end of each of the contact arm portions 78, in a fashion such that the stem portions 87 project downwardly and through stem apertures 88 (FIGS. 6 and 7) formed in a false base 85 which is secured by means of threaded screws 89 to the bottom of the base 11 and which otherwise encloses and conceals the safety switches 73 and 74. The screws 89 also serve to secure feet 83 of rubber or other resilient material to the bottom of the base 11. Additionally, the rubber feet provide air circulation beneath the steam chest to promote cooling in the electrical circuit area.

The safety switches 73 and 74 normally are biased so as not to engage the electrical contacts 81, and hence when the power cord 75 is coupled to a source of power, the energizing circuit for the electrodes 41, 42 is open. When the steam chest 10 is seated on a support surface, the latter engages the ends of the stem portions 87 and forcibly urges them into the stem apertures 88. This action, in turn, bends the contact arm portions 78 of the safety switches 73 and 74 to engage the electrical contacts 81 and to thereby close the energizing circuit for the electrodes.

As indicated above, the steam chest 10 includes a reservoir 65 and, during use, the latter contains water. If the party using the steam chest should tilt or lift it so as to cause this water to flow over the top of the preforated tray 14, the possibility exists that the user may accidentally place the fingers of one hand in this water and simultaneously place the other hand on a grounded object. If this should happen and the water also engages one or both of the electrodes 41, 42, a severe electrical shock could result. The safety switches 73 and 74 completely eliminate this possibility since one or both of these safety switches is operated to open the energizing circuit for the electrodes, as soon as the steam chest 10 is tilted or lifted.

The power cord 75 is led into the area defined by the bottom of the steam well base 69 and the top of the false base 85 through an inlet port 118. As shown in FIG. 8, the power cord 75 is split into its two separate electrode leads 76 which are secured against dislodgement by means of the labyrinth lead lock 115. The labyrinth lead lock 115 is defined by the Y-shaped wall portion 116, and a peripheral W-shaped wall portion 117. The pathway of the electrode leads 76 is that of a reverse bend terminating in two sharp corners which results in a self-locking attachment when an attempt is made to pull the power cord 75 through the inlet port 118. By employing the labyrinth lead lock 115, the necessity for tying an underwriter's or strain relief knot is eliminated. The wires may be preformed for quick assembly into the labyrinth-like pathway, and greater security and safety in operation is achieved. Furthermore, it will be noted that the labyrinth lead lock is positioned directly beneath the reservoir 65 where the water is considerably cooler than the steam well 60. This location insures the electrode leads 76 and power cord 75 in a position of relatively low temperature, and hence further security against insulation damage attributable to heat. The convoluted channel is additionally defined by the false base 85. A locking screw 119 is secured in the lock screw threaded hole 120 in the lock screw boss 121. By leading the power cord 75 through the small inlet port 118, the false base 85 is completely uncluttered and effectively secures the wiring area from contact by the user. Small rubber feet 83 are preferably screwed to the base by means of a screw in the center open portion of each of the rubber feet. Preferably the rubber feet are a non-marking material, and the central hole not only serves to recess the mounting screw, but provides additional friction to prevent slipping, and the consequent possibility of spilling or otherwise dispersing the water in the course of use.

As discussed above, the invention also is concerned primarily with the suppression of current leakage, arcing, and tracking. The bubbling of the steam generated within the steam well 60 can cause moisture to collect on top of the perforated tray 14 around the perforated base 54. To preclude large bubbles and considerable moisture collecting which can result in current leakage in excess of one to two milliamps, a bubble plate 90 is provided which is generally rectangular, and contains a plurality of bubble plate perforations 91. The bubble plate 90 is positioned atop the bubble plate support posts 92 at four locations within the steam well 60 on the dam sides 62. The bubble plate is proportioned to screen the areas atop the electrodes 41, 42 which are in opposed facial relationship and where the bulk of the current passes, and the bulk of the steam generates by means of heating and the ensuing vigorous bubbling. The tops of the bubble plate support posts 92 are slightly below the dam wall sides 62 so that the thickness of the bubble plate 90 positions the latter in flush relationship with the top of the dam side wall 62. The bubble plate 90 can be fixedly held, however, preferably it is merely confined and permitted to float in relationship with the top of the dam side walls 62. As indicated above, the ribs 22 on the underside of the roller tray 14 form one diamond which is centrally positioned and, as can be best seen in FIG. 2, the bubble plate 90 is disposed to be confined by the ribs forming this diamond. Accordingly, the bubble plate 90 is free to float so that it raises and lowers, depending upon the extent of bubbling of the water in the steam well 60. When the bubble plate 90 is free floating, it is generally found that the large bubbles are more thoroughly broken up and the amount of moisture which collects is substantially reduced.

Thus in operation the bubble plate 90 serves to minimize the amount of moisture which can contribute to the current leakage within the steam chest assembly 10. Additionally, electrode bridges 94 are provided which fit within electrode bridge mounting notches 93 provided in the side walls 62 of the rectangular dam 61 outboard and adjacent to the bubble plate support posts 92. The electrode bridge mounting notches 93 and hence the electrode bridge 94, as can be best seen in FIG. 2 are located so that the U-shaped ends of the electrodes 41 and 42 are confined and held in spaced relation from the other one of the electrodes, by the electrode bridges 94. Accordingly, with this arrangement, it is virtually impossible for these ends to become mis-aligned and shorted out. As will be observed particularly in FIGS. 2 and 3, the electrode bridges 94 also are positioned so as to assist in maintaining the bubble plate in position, and the electrode bridge mounting notches 93 are proportioned along with the thickness of the electrode bridge 94 to achieve this relationship.

The details of construction of the electrode bridge 94 are best shown in the plan view in FIG. 5. There it will be seen that the electrode bridge 94 has an electrode bridge spanner portion 100 which depends from the longitudinal electrode bridge beam 104. The spanner 100 has spanner sides 101 which are spaced approximately the distance between the U-shaped body portions 47, 48 of the electrodes 41, 42. The spanner bottom 102 is proportioned so that the distance of the spanner bottom 102 from the steam well base 69 in assembled relationship is slightly less than the height of the U-shaped electrode portions 47, 48 thereby preventing the same from dislodgment and passing beneath the spanner bottom 102. As will be observed, the electrode legs are shown in dotted lines in FIG. 5. Furthermore, as pointed out above, the electrodes 41, 42 are mounted by means of their ends 45 to spring yieldably upwardly and therefore abut the bridge spanner abutments 108 in yieldable engagement so that any tendency for the electrodes 41, 42 to pass beneath the spanner bottom 102 is further inhibited.

The electrode bridge beam 104 terminates in electrode bridge beam ends 105 which, in turn, are proportioned to fit within the electrode bridge mounting notches 93 in the side walls 62 of the steam well 60. The electrode bridge beam top 109 is proportioned by means of the electrode bridge beam ends 105 to be flush with the ribs 22 of the roller tray 14. Finally, it will be observed that a radiused electrode bridge beam arch 106 is provided to merge the configuration of the electrode bridge beat 104 into the electrode bridge spanner portion 100. Further, to eliminate corners from which arcing and tracking can occur, as will be observed particularly in FIG. 3, a radiused end 43 is provided on the free end of each of the U-shaped electrodes 41, 42.

More specifically, in a successfully tested commercial embodiment, the electrodes are 5/16" in height, and have a 1/4" radius on the end portions thereof. This, of course, abuts the 1/2" width of the spanner bridge sides 101. The free end of the electrodes terminates 7/32" spaced from the spanner bridge. The spacing between the spanner bridge bottom 102 and the steam well bottom 69 is 1/4" thereby providing 1/16" interference to prevent dislodgment of the electrodes 41, 42 by jostling beneath the bridge 94 while in transit. The electrode bridge is made from one piece of polyester fiberglass approximately 1/8" thick which is flame retardant, steam resistant, and has good dielectric properties. The supporting ribs 92 for the bubble plate 90 are 1/16" square and positioned on 2 1/4" centers. The bubble plate is approximately 2 5/8" long by 1 5/16" wide and is also made of 1/16" polyester fiberglass having a plurality of 5/32" holes on 5/16" centers. Thus the bridge 94 is approximately 1/8" thick, and terminates in 5/32" ends 105 which fit within correspondingly proportioned notches 93.

The electrodes 41, 42 preferably are hydrogen annealed after they have been formed and punched since it is found that work hardening of the electrodes causes them to change shape when in operation. In extreme cases, the warpage of the electrodes is such that they may touch one another and hence short out. The hydrogen annealing substantially eliminates this.

In review it will be seen that a resistance heater assembly has been provided in which the electrodes, which are cantileverly supported, are secured against dislodgment by a bridge, which is only in electrical and physical contact with electrodes of like polarity. Thus any potential of tracking or arcing across the bridge is held to a minimum. Furthermore, by radiusing the ends of the electrodes, additional areas of possible arcing and tracking are eliminated. Because the electrodes are pre-stressed for loading in an upward direction, and the bridge is secured by means of the perforated roller tray, all elements cooperate to effect a soundly positioned arrangement preventing spacial dislocations, and the possibility of arcing and tracking as a result of disfiguration occurring in use. The positioning of the electrode bridge and assembly further insures proper alignment of the electrodes. Finally, a bubble plate has been provided which, in those applications where necessary, will secure the unit against bubbling on top of the perforated roller tray which could, in turn, result in additional undesirable current leakage.

Although particular embodiments of the invention have been shown and described in full here, there is no intention to thereby limit the invention to the details of such embodiments. On the contrary, the intention is to cover all modifications, alternative embodiments, usages and equivalents of a resistance heating assembly as fall within the spirit and scope of the invention, specification, and the appended claims.

I claim:

1. A resistance heating assembly comprising, in combination, a steam well having opposed walls, means for admitting fluid to said steam well, a pair of U-shaped interdigited electrodes, each electrode having a free end, a reversely bent end and a mounting portion; means at opposed positions on said steam well for securing the mounting portions of the respective electrodes; and a pair of bridge members for insuring the spacing between the opposed electrodes, each bridge member being utitarily formed with a beam portion and a spanner portion, said beam portions being proportioned to bridge the opposed walls of said steam well and secure said bridge member in place with respect to said steam well, and said spanner portions being proportioned to engage said electrodes adjacent the reversely bent portions thereof thereby positioning said electrodes within said steam well with contact only on one electrode and the walls of said steam well, each of said electrodes having a prestressed bend in the mounting portion thereof thereby insuring yieldable engagement with the bridges.

2. The resistance heating assembly of claim 1, wherein said spanner portions of said bridge members are proportioned to depend into said steam well above its bottom a distance less than the width of said electrodes thereby preventing the latter from being dislodged downwardly and laterally into electrical or physical contact with an adjacent electrode.

3. The resistance heating assembly of claim 1, further including a power cord for coupling said pair of electrodes to a source of power and a power cord safety lock for said power cord on the base of the device containing said assembly comprising a V shaped wall having a cord opening at its apex, a W shaped wall, said walls being proportioned to define opposed reversely bent labyrinth-like channels, port means for receiving said power cord at the apex of the V shaped wall, and a closure member affixed to said base secured atop said V shaped and W shaped walls to lockingly receive the power cord split wires and lead each to a terminal of said electrodes.

4. A resistance heating assembly comprising, in combination, a steam well having opposed walls, means for admitting fluid to said steam well, a pair of U-shaped interdigited electrodes, each electrode having a free end, a reversely bent end and a mounting portion; means at opposed positions on said steam well for securing the mounting portions of the respective electrodes; and a pair of bridge members for insuring the spacing between the opposed electrodes, each bridge member being unitarily formed with a beam portion and a spanner portion, said beam portions being proportioned to bridge the opposed walls of said steam well and secure said bridge member in place with respect to said steam well, and said spanner portion being proportioned to engage said electrodes adjacent the reversely bent portions thereof thereby positioning said electrodes within said steam well with contact only on one electrode and the walls of said steam well, means defining slots in the opposed walls of said steam well for receiving the ends of said beam portions of said bridge members, and perforated bubble plate means covering said steam well.

5. The resistance heating assembly of claim 4, wherein said bubble plate is fixedly secured atop said walls of said steam well.

6. The resistance heating assembly of claim 4, wherein said bubble plate is free floating and confined so as to be aligned atop said walls of said steam well by means of ribs formed on the underside of tray means adapted to seat atop the resistance heating assembly.

7. A resistance heating assembly comprising, in combination: a fluid reservoir; a steam well centrally of said fluid reservoir having upwardly extending opposed walls, metering means in said opposed walls in open communication between said fluid reservoir and said steam well for permitting fluid in said fluid reservoir to flow into said steam well; a pair of U-shaped electrodes secured within said steam well, each of said electrodes having a pair of legs which are interdigital to form three vertical resistance heating channels therebetween to facilitate rapid steam generation of the fluid within said steam well, and a pair of bridge members for insuring the spacing between said electrodes, each of said bridge members having a beam portion and a spanner portion, said beam portions being proportioned to bride the opposed walls of said steam well and said spanner portion being proportioned to be received between and to engage said legs of said electrodes at the U-shaped ends thereof to position said electrodes within said steam well, each of said bridge members being in contact with only one of said electrodes respectively and said opposed walls of said steam well, each of said electrodes being prestressed to insure a yieldable engagement of said electrodes with said bridges.

8. The resistance heating assembly of claim 7, wherein the end of one leg of each of said electrodes forms a mounting portion, said mounting portions having a prestressed bend for insuring a yieldable engagement of said electrodes with said bridges.

9. The resistance heating assembly of claim 7, further including a perforated bubble plate covering a major portion of said electrodes within said steam well for breaking up bubbles forming in said steam well.

10. The resistance heating assembly of claim 9, wherein said bubble plate means is fixedly secured atop the opposed walls of said steam well.

11. The resistance heating assembly of claim 9, wherein said bubble plate means is free floating and is confined so as to be aligned atop the opposed walls of said steam well and said bridge members by means of ribs formed on the underside of tray means adapted to seat atop the resistance heating assembly.

12. The resistance heating assembly of claim 7, further including means defining slots in the oposed walls of said steam well for receiving the ends of said beam portions of said bridge members.

13. The resistance heating assembly of claim 7, wherein said spanner portions of said bridge members are proportioned to depend into said steam well above the bottom thereof a distance less than the width of said electrodes, to thereby prevent the latter from being dislodged downwardly and latterally into electrical or physical contact with the other one of said electrodes.

14. The resistance heating assembly of claim 7, further including safety switch means comprises at least one leaf spring included in said energizing circuit between one of said pair of electrodes and a source of power, a button at the end of said leaf spring proportioned to engage the surface upon which the device in which said assembly is contained is placed to close said energizing circuit to energize said resistance heating assembly, said leaf spring when said device is tilted or lifted from said surface being operated to open said energizing circuit to de-energize said resistance heating assembly, whereby the latter is energized only when said button is in contact with the surface upon which the device is placed.

References Cited

UNITED STATES PATENTS

| | | | |
|---|---|---|---|
| 1,175,442 | 3/1916 | Hanks | 219—284 X |
| 1,618,101 | 2/1927 | Malcolm | 219—289 X |
| 1,784,020 | 12/1930 | McKinley | 339—105 |
| 2,000,628 | 5/1935 | White | 219—273 |
| 2,128,883 | 8/1938 | Burt | 339—107 |
| 2,158,698 | 5/1939 | Hettinger | 219—271 |
| 2,230,245 | 2/1941 | Hettinger | 219—275 X |
| 3,020,385 | 2/1962 | Conlin et al. | 219—275 X |
| 3,047,699 | 7/1962 | Patti | 219—518 |
| 3,222,499 | 12/1965 | Conlin et al. | 219—293 X |
| 3,347,618 | 10/1967 | McKeown | 219—284 X |

FOREIGN PATENTS

| | | |
|---|---|---|
| 270,050 | 4/1966 | Australia. |
| 706,979 | 3/1965 | Canada. |
| 610,626 | 10/1948 | Great Britain. |
| 216,548 | 1/1942 | Switzerland. |
| 249,827 | 5/1948 | Switzerland. |
| 911,502 | 3/1946 | France. |

ANTHONY BARTIS, Primary Examiner

21—95; 200—61.52; 219—275, 295, 401, 518, 541; 339—107